(12) United States Patent
Al-Duwaish et al.

(10) Patent No.: US 8,400,504 B2
(45) Date of Patent: Mar. 19, 2013

(54) CONTAMINATION MONITORING OF HIGH VOLTAGE INSULATORS

(75) Inventors: Hussain N. Al-Duwaish, Dhahran (SA); Zakariya M. Al-Hamouz, Dhahran (SA); Wail A. Mousa, Dhahran (SA); Munir A. Al-Absi, Dhahran (SA); Salam A. Zummo, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 408 days.

(21) Appl. No.: 12/662,194

(22) Filed: Apr. 5, 2010

(65) Prior Publication Data
US 2011/0242313 A1  Oct. 6, 2011

(51) Int. Cl.
*H04N 7/18* (2006.01)
(52) U.S. Cl. .......................... 348/128; 348/130
(58) Field of Classification Search ........... 348/126–134
See application file for complete search history.

(56) References Cited

U.S. PATENT DOCUMENTS

| | | | | |
|---|---|---|---|---|
| 4,174,464 A | * | 11/1979 | Kawaguchi et al. | 174/212 |
| 4,393,286 A | * | 7/1983 | Takagi | 218/139 |
| 4,736,272 A | * | 4/1988 | Kato et al. | 361/138 |
| 4,891,473 A | * | 1/1990 | Nigol | 174/150 |
| 5,335,012 A | * | 8/1994 | Lisec | 348/92 |
| 5,991,146 A | * | 11/1999 | Bokhary | 361/213 |
| 6,185,337 B1 | | 2/2001 | Tsujino et al. | |
| 6,613,985 B2 | * | 9/2003 | Irie et al. | 174/140 C |
| 7,212,655 B2 | | 5/2007 | Tumey et al. | |
| 7,295,687 B2 | | 11/2007 | Kee et al. | |
| 7,532,745 B2 | | 5/2009 | Inoue | |
| 7,676,441 B2 | | 3/2010 | Matsugu et al. | |
| 7,733,479 B2 | * | 6/2010 | Shew et al. | 356/244 |
| 7,737,371 B2 | * | 6/2010 | Hesse | 174/650 |
| 7,754,965 B2 | * | 7/2010 | Rizk et al. | 174/30 |
| 7,797,781 B2 | * | 9/2010 | Park et al. | 15/88.4 |
| 8,190,552 B2 | * | 5/2012 | Kim et al. | 706/62 |
| 2005/0144645 A1 | * | 6/2005 | Casey et al. | 725/95 |
| 2008/0020655 A1 | * | 1/2008 | Rizk et al. | 439/894 |
| 2009/0109021 A1 | * | 4/2009 | Paoletti et al. | 340/540 |

FOREIGN PATENT DOCUMENTS

| | | |
|---|---|---|
| CN | 2655228 Y | 11/2004 |
| CN | 200975900 Y | 11/2007 |
| JP | 2000314702 A | 11/2000 |
| JP | 2007014098 A | 1/2007 |

* cited by examiner

*Primary Examiner* — Christopher S Kelley
*Assistant Examiner* — Jonathan Messmore
(74) *Attorney, Agent, or Firm* — Richard C. Litman

(57) ABSTRACT

Contamination monitoring of high voltage insulators provides a system and method producing an early predictor for high voltage insulator failure, allowing repairmen to either already be on site when a high voltage insulator fails in order to expedite repair time, or allowing repair and/or replacement of a faulty insulator before the failure actually occurs. The system and method provide transmission of an alarm signal when contaminant levels (such as equivalent salt deposit density (ESDD) levels) formed on a high voltage insulator exceed pre-selected threshold values, indicating the likelihood of high voltage insulator failure.

7 Claims, 4 Drawing Sheets

CONTAMINATION MONITORING OF HIGH VOLTAGE INSULATORS

BACKGROUND OF THE INVENTION

1. Field of the Invention

The present invention relates to the maintenance of high-voltage electrical equipment, and particularly to a system and method for contamination monitoring of high voltage insulators that provides for transmission of an alarm signal when contaminant levels (such as equivalent salt deposit density (ESDD) levels) formed on a high voltage insulator exceed pre-selected threshold values, indicating the likelihood of high voltage insulator failure.

2. Description of the Related Art

FIG. 2 illustrates a typical high voltage insulator I. Conventional high voltage transmission lines L typically use modular cap and pin insulators, such as high voltage insulator I. The wires or lines L are suspended from a string of substantially identical disc-shaped insulators D that are attached to each other with metal clevis pin or ball-and-socket links. The advantage of this design is that insulator strings with different breakdown voltages, for use with different line voltages, can be constructed by using different numbers of the basic units (i.e., different numbers of disc-shaped insulators D). The breakdown voltage of an insulator is the minimum voltage that causes a portion of the insulator to become electrically conductive.

When an insulator is polluted or wet, its ability to withstand mechanical and electrical stresses, as well as its flashover voltage, is greatly reduced. Contaminant particles in the presence of moisture form conducting films on the surfaces of discs D, allowing leakage currents to form and be transmitted. This current heats the surfaces, leading to formation of dry bands in areas of high current density. High voltages then build up across those bands, which may cause partial discharges, leading to insulator flashover.

Insulator surface contamination, and subsequent flow of leakage current, has caused operating problems for electric power utilities since electrical power has been in use. The effect of leakage current and insulator flashover is a major practical concern for continuity of electric power supply.

Detection of a failed or contaminated insulator requires either visual inspection or disruption of the normal electrical power supply. In other words, failure must first occur before repairs can be made. It would be desirable to provide an early predictor for high voltage insulator failure, allowing repairmen to either already be on site when the insulator fails, in order to expedite repair time, or to allow repair and/or replacement of a faulty insulator before the failure actually occurs.

Insulator contamination is often a result of exposure to various pollution types, including desert sandstorms, airborne salt from the sea, industrial pollution, high humidity and fog, in addition to high ambient temperatures and large ambient temperature differences within a 24-hour cycle. Typically, electric utilities perform scheduled periodic high-pressure water, live-line and sub-station insulator washing. The practice of periodic insulator washing is not particularly cost effective, due to the fact that insulator performance is determined by a number of parameters, some of which are variable and mostly unpredictable.

Thus, a system and method for contamination monitoring of high voltage insulators solving the aforementioned problems is desired.

SUMMARY OF THE INVENTION

The system and method for contamination monitoring of high voltage insulators provides an early predictor for high voltage insulator failure, allowing repairmen to either already be on site when a high voltage insulator fails in order to expedite repair time, or allowing repair and/or replacement of a faulty insulator before the failure actually occurs. The system and method for contamination monitoring of high voltage insulators transmits an alarm signal when contaminant levels (such as equivalent salt deposit density (ESDD) levels) formed on a high voltage insulator exceed pre-selected threshold values, indicating the likelihood of high voltage insulator failure.

In use, a database of equivalent salt deposit density eigenvalues is first stored in computer readable memory. A high voltage insulator is then visually monitored by a digital camera or the like mounted proximate to the high voltage insulator. The digital camera produces a digitized visual image of the high voltage insulator, which is then transmitted via a wireless transceiver, a wireless modem or the like.

The digitized visual image is then receiving by a wireless transceiver connected to a controller. The controller, preferably through use of an associated neural network, extracts a set of visual eigenvalues from the digitized visual image that represent visual indicators of contaminants. The set of visual eigenvalues are compared with the database of equivalent salt deposit density eigenvalues stored in the computer readable memory. The controller then calculates an equivalent salt deposit density level formed on the high voltage insulator based upon the comparison of the set of visual eigenvalues with the database of equivalent salt deposit density eigenvalues stored in the computer readable memory. An alarm signal is transmitted when the calculated equivalent salt deposit density level formed on the high voltage insulator is greater than a pre-selected threshold value of equivalent salt deposit density.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
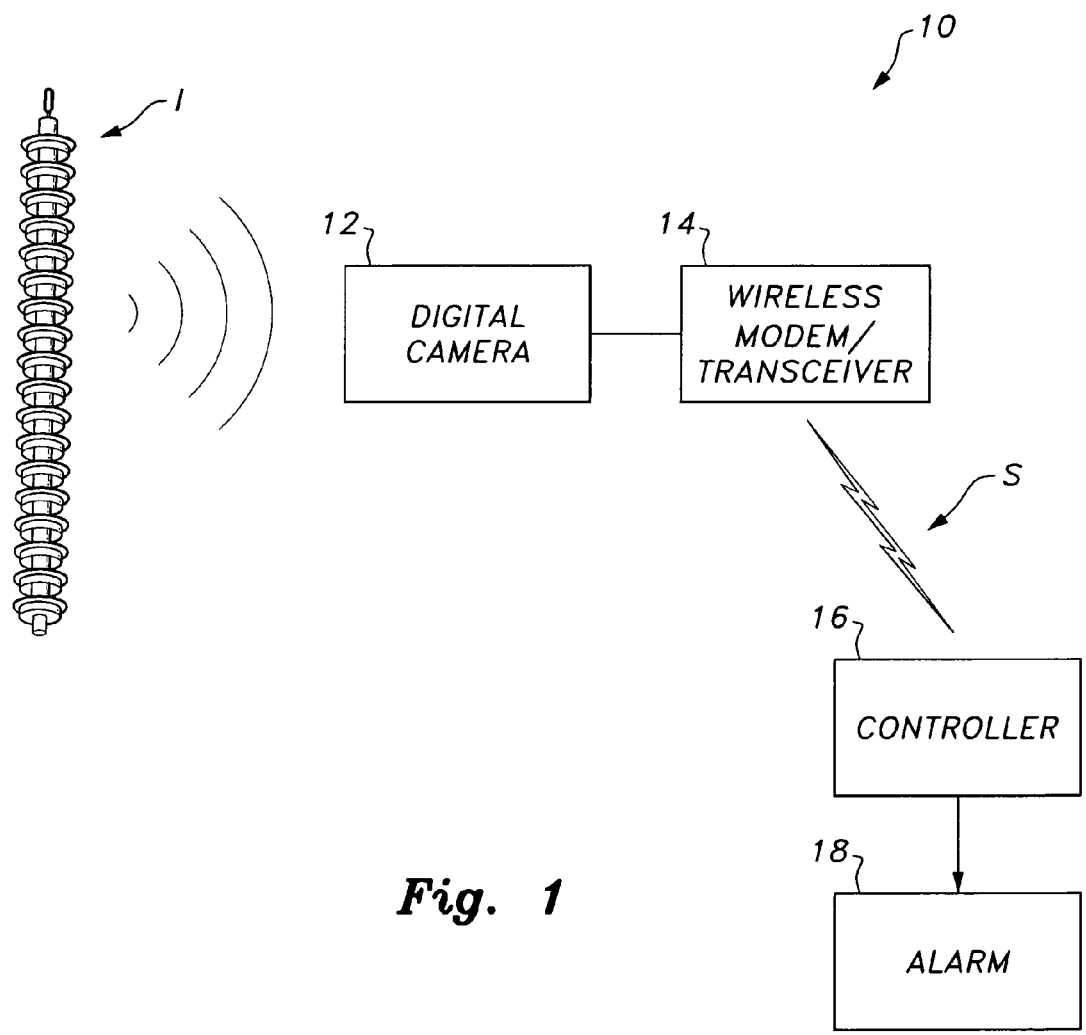
FIG. 1 is block diagram schematically illustrating a system for contamination monitoring of high voltage insulators according to the present invention.
Figure 2:
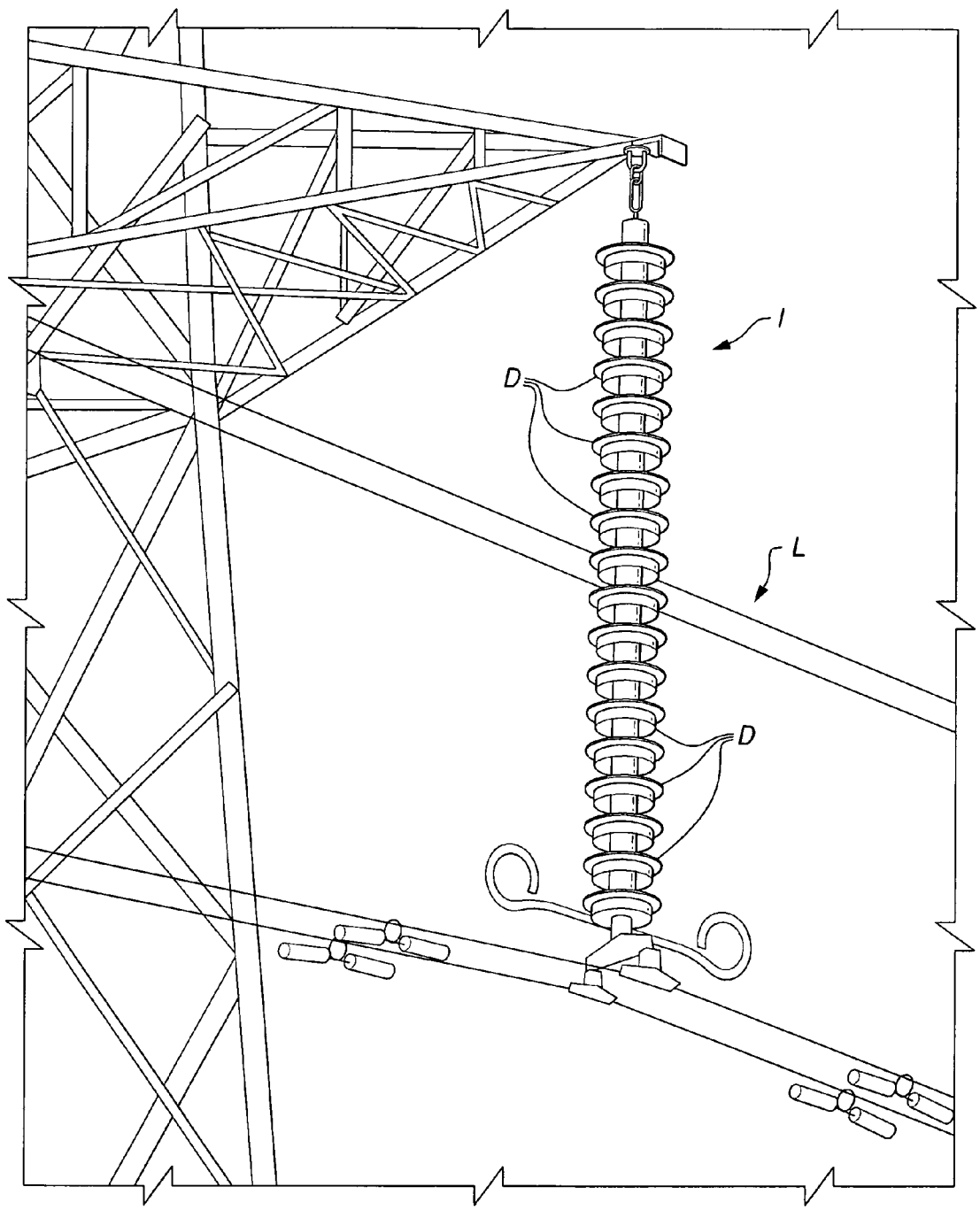
FIG. 2 illustrates a typical high voltage insulator string mounted on a high voltage power line according to the prior art.

As best shown in FIG. 1, a system for contamination monitoring of high voltage insulators 10 provides an early predictor for high voltage insulator failure, allowing repairmen to either already be on site when a high voltage insulator, such as exemplary insulator I, fails in order to expedite repair time, or allowing repair and/or replacement of a faulty insulator I before the failure actually occurs. As will be described in greater detail below, the system for contamination monitoring of high voltage insulators 10 transmits an alarm signal when contaminant levels (such as equivalent salt deposit density (ESDD) levels) formed on the high voltage insulator exceed pre-selected threshold values, indicating the likelihood of high voltage insulator failure.

Figure 3:
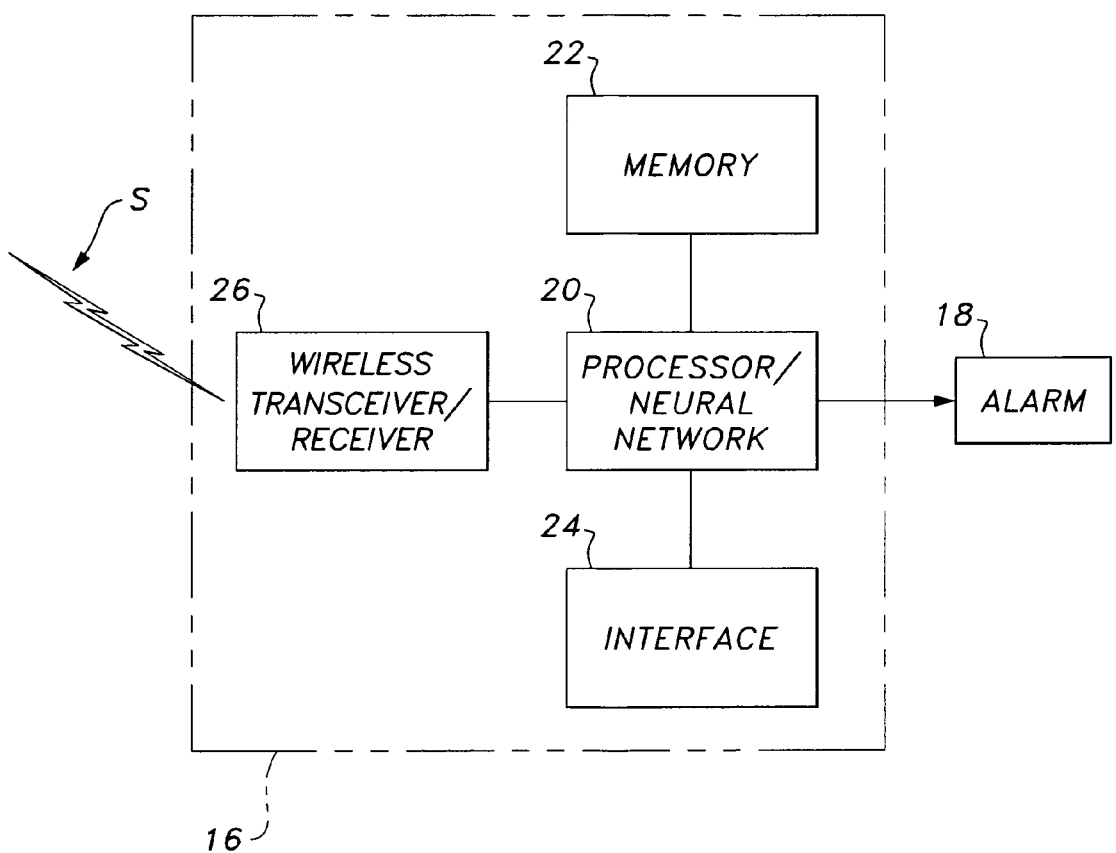
FIG. 3 is a block diagram illustrating a controller for a system for contamination monitoring of high voltage insulators according to the present invention.

As shown in FIG. 3, a controller 16 is provided, with computer readable memory 22 being associated therewith. A database of equivalent salt deposit density eigenvalues is stored in computer readable memory 22. It should be understood that computer readable memory 22 may be any suitable type of computer readable memory. Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 22, or in place of memory 22, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

A high voltage insulator, such as exemplary insulator I, is then visually monitored by a digital camera 12 or the like, mounted proximate to the high voltage insulator I (as represented diagrammatically in FIG. 1). The digital camera 12 produces a digitized visual image of the high voltage insulator I, which is then transmitted via a wireless transceiver 14, a wireless modem or the like. Alternatively, the image could be transmitted via a conventional wired line, or through any suitable type of communication interface. In FIG. 1, wireless signal S is transmitted to controller 16.

The signal S carrying the digitized visual image is received by a wireless transceiver 26 connected to controller 16. It should be understood that the controller 16 and the memory 22 may be associated with, or incorporated into, any suitable type of computing device, for example, a personal computer or a programmable logic controller. Additionally, any suitable type of interface 24 may be associated with controller 16, such as a keyboard, a mouse, a display or the like. The controller 16, the memory 22, the wireless transceiver or receiver 26, interface 24, and any associated computer readable recording media are in communication with one another by any suitable type of data bus, as is well known in the art.

Processor 20 of controller 16, which may include, or be in communication with, an associated neural network, extracts a set of visual eigenvalues from the digitized visual image representing visual indicators of contaminants. It should be understood that any suitable image processing and pattern recognition techniques may be utilized, as are well-known in the arts of medicine, seismology, geology, face recognition, fingerprint recognition, and the like. Examples of such systems are shown in U.S. Pat. Nos. 7,676,441; 7,532,745; 7,295,687; 7,212,655; and 6,185,337, each of which is hereby incorporated by reference in its entirety.

Figure 4:
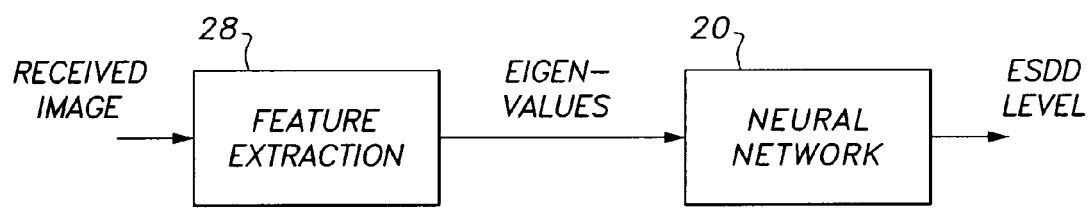
FIG. 4 is a block diagram illustrating process flow in the controller of FIG. 3.

In the flow diagram of FIG. 4, the received image goes through a step of "feature extraction" 28, in which the set of visual eigenvalues are extracted from the transmitted digital image. These eigenvalues, representing the visual contaminant images, are then passed to the neural network and/or processor 20. The set of visual eigenvalues are compared with the database of equivalent salt deposit density eigenvalues stored in the computer readable memory 22.

The processor 20 then calculates an equivalent salt deposit density level formed on the high voltage insulator I based upon the comparison of the set of visual eigenvalues with the database of equivalent salt deposit density eigenvalues stored in the computer readable memory. The equivalent salt deposit density eigenvalues stored in computer readable memory 22 represent pre-recorded visual indicators of contamination. A high voltage insulator with a known ESDD level (typically measured in milligrams of NaCl per $cm^2$ of insulator surface area) is analyzed in a laboratory or the like, a digital image of this high voltage insulator is recorded, and eigenvalues of the image are extracted, thus forming a database of visual eigenvalues with known contaminant levels. System 10 uses this database to record new eigenvalues from the digital image of insulator I, compare the eigenvalues with the stored database of eigenvalues, and then finds the equivalent contaminant level.

An alarm signal is transmitted by controller 16 to alarm 18 when the calculated equivalent salt deposit density level formed on the high voltage insulator I is greater than a pre-selected threshold value of equivalent salt deposit density, the threshold level being stored in memory 22. An exemplary threshold value is 0.1 mg/$cm^2$. The alarm 18 may be any suitable type of alarm, such as a visual alarm, an audio alarm or the like.

It is to be understood that the present invention is not limited to the embodiments described above, but encompasses any and all embodiments within the scope of the following claims.

We claim:

1. A system for contamination monitoring of high voltage insulators, comprising:
    means for visually monitoring a high voltage insulator with a salt deposit;
    means for transmitting a digitized visual image of the high voltage insulator and the salt deposit;
    means for receiving the digitized visual image;
    means for extracting a set of visual eigenvalues from the digitized visual image, the set of visual eigenvalues representing visual indicators of salt deposit contaminants;
    computer readable memory, a database of equivalent salt deposit density eigenvalues being stored therein, the database includes visual eigenvalues with known contaminant levels, wherein a pre-selected threshold value of equivalent salt deposit density being stored in the memory;
    means for directly comparing the set of visual, real-time eigenvalues with the database of equivalent salt deposit density eigenvalues stored in the computer readable memory;
    means for calculating an equivalent salt deposit density level formed on the high voltage insulator based upon the direct comparison of the set of visual eigenvalues with the database of equivalent salt deposit density eigenvalues stored in the computer readable memory; and
    means for transmitting an alarm signal when the calculated equivalent salt deposit density level formed on the high voltage insulator is greater than the pre-selected threshold value of equivalent salt deposit density.

2. The system for contamination monitoring of high voltage insulators as recited in claim 1, wherein said means for visually monitoring the high voltage insulator comprises a digital camera mounted proximate the high voltage insulator.

3. The system for contamination monitoring of high voltage insulators as recited in claim 2, wherein said means for transmitting the digitized visual image of the high voltage insulator comprises a wireless transceiver in communication with the digital camera.

4. The system for contamination monitoring of high voltage insulators as recited in claim 3, wherein the wireless transceiver comprises a wireless modem.

5. The system for contamination monitoring of high voltage insulators as recited in claim 4, wherein said means for receiving the digitized visual image comprises a wireless modem.

6. The system for contamination monitoring of high voltage insulators as recited in claim 1, wherein said means for extracting the set of visual eigenvalues from the digitized visual image comprises a neural network.

7. A method for contamination monitoring of high voltage insulators, comprising the steps of:

storing a database of equivalent salt deposit density eigenvalues in computer readable memory, the database includes visual eigenvalues with known contaminant levels, wherein a pre-selected threshold value of equivalent salt deposit density being stored in the memory;

visually monitoring a high voltage insulator with a salt deposit;

transmitting a digitized visual image of the high voltage insulator and the salt deposit;

receiving the digitized visual image;

extracting a set of visual eigenvalues from the digitized visual image, the set of visual eigenvalues representing visual indicators of salt deposit contaminants;

directly comparing the set of visual eigenvalues with the database of equivalent salt deposit density eigenvalues stored in the computer readable memory;

calculating an equivalent salt deposit density level formed on the high voltage insulator based upon the direct comparison of the set of visual eigenvalues with the database of equivalent salt deposit density eigenvalues stored in the computer readable memory; and transmitting an alarm signal when the calculated equivalent salt deposit density level formed on the high voltage insulator is greater than the pre-selected threshold value of equivalent salt deposit density.

\* \* \* \* \*